Figure 1:
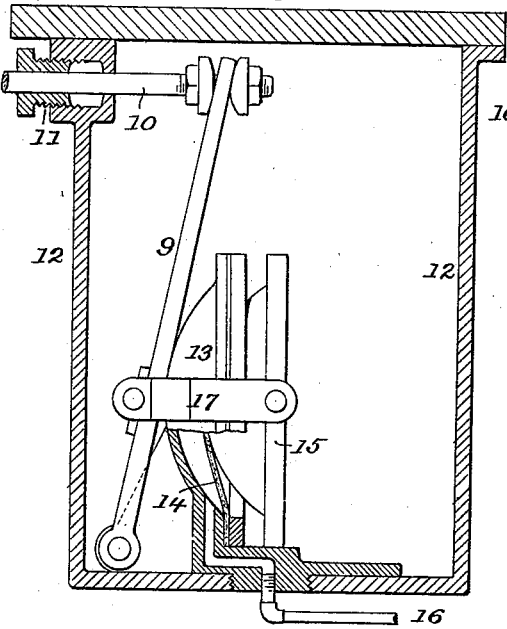

(No Model.)　　　　　　　　　　　　　　　　　　　4 Sheets—Sheet 1.
W. P. ELLIOTT.
RAILWAY SWITCH SYSTEM AND APPARATUS.

No. 540,729.　　　　　　　　　　　　Patented June 11, 1895.

Attest:
Wilson G. Bates
William P. Elliott Jr.

Inventor:
William P. Elliott (No Model.) 4 Sheets—Sheet 2.
W. P. ELLIOTT.
RAILWAY SWITCH SYSTEM AND APPARATUS.
No. 540,729. Patented June 11, 1895.
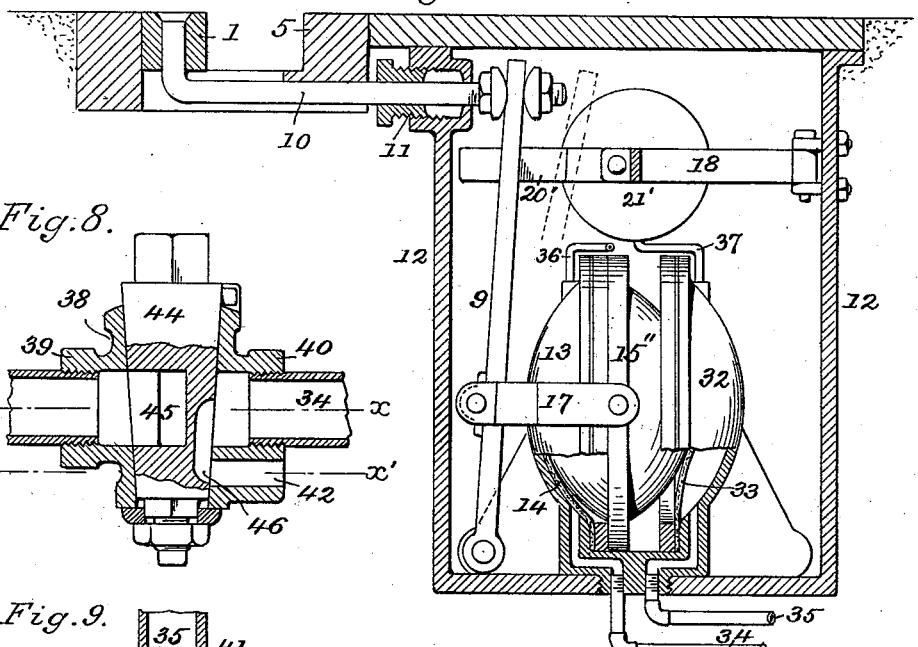
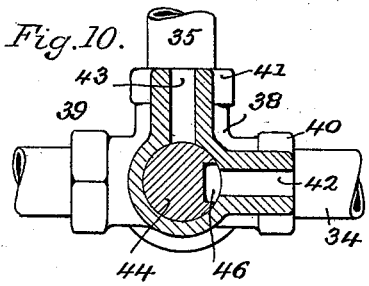
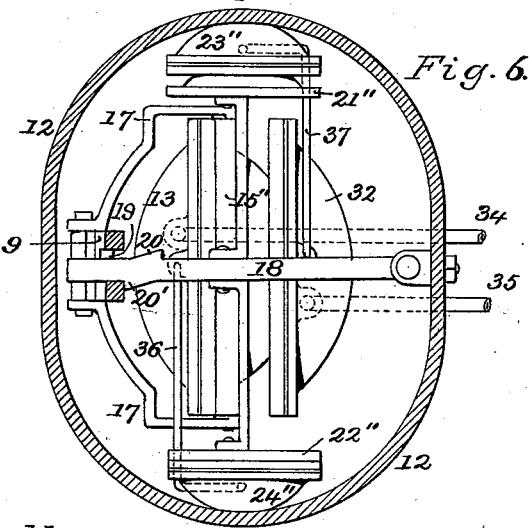
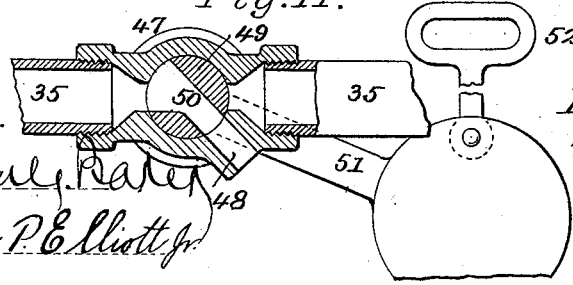
Attest:
William J. Raley
William P Elliott Jr
Inventor:
William P. Elliott (No Model.) 4 Sheets—Sheet 3.
W. P. ELLIOTT.
RAILWAY SWITCH SYSTEM AND APPARATUS.

No. 540,729. Patented June 11, 1895.

Attest:
Wilson J. Baker
William P. Elliott Jr.

Inventor:
William P. Elliott.

(No Model.)
W. P. ELLIOTT.
RAILWAY SWITCH SYSTEM AND APPARATUS.
No. 540,729.  Patented June 11, 1895.
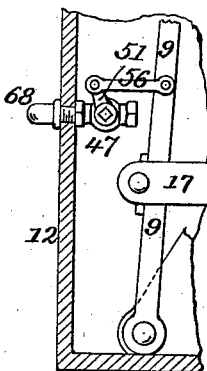
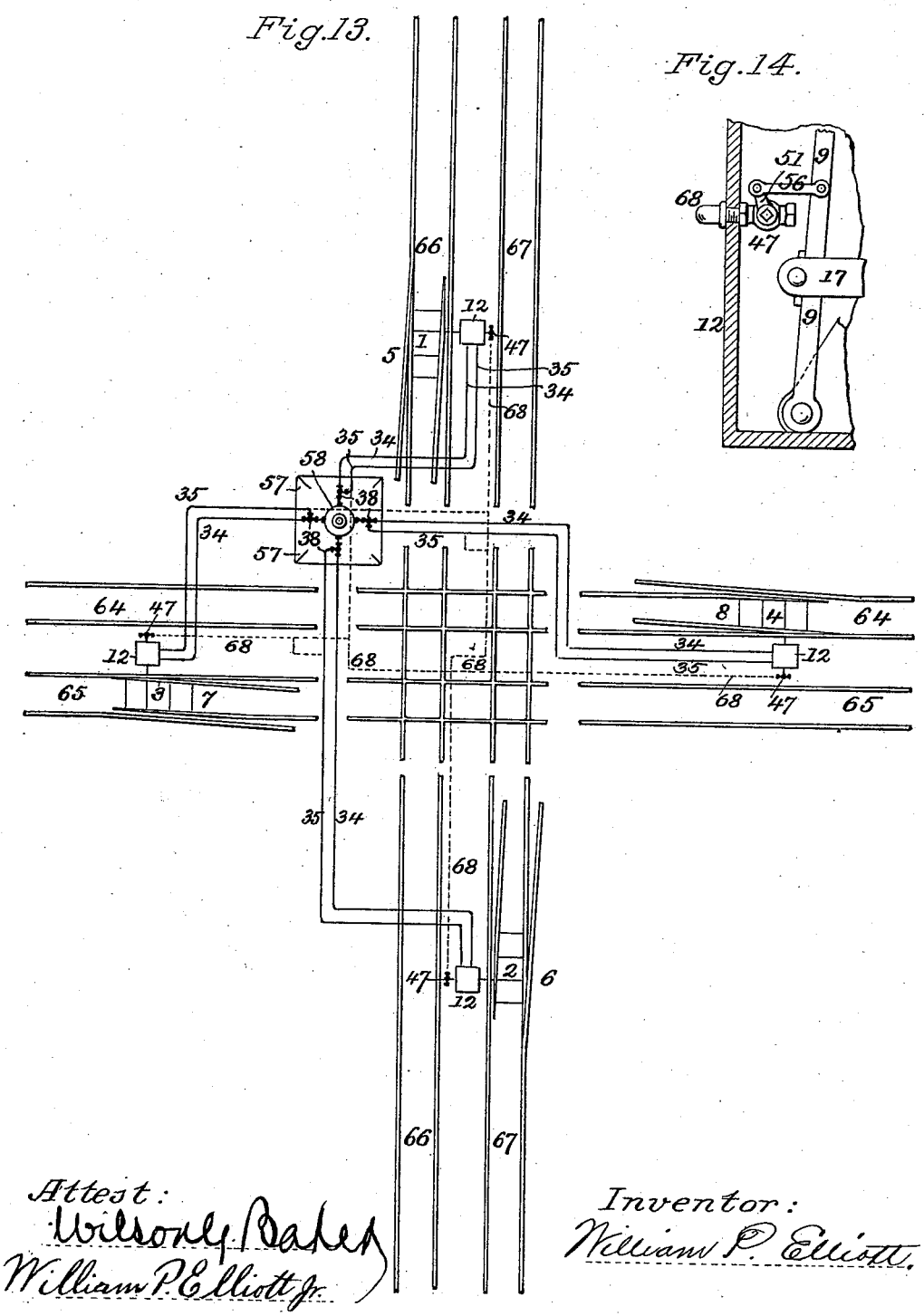
Attest:
Wilson G. Bates
William P. Elliott Jr.
Inventor:
William P. Elliott

UNITED STATES PATENT OFFICE.

WILLIAM P. ELLIOTT, OF CHICAGO, ILLINOIS.

RAILWAY-SWITCH SYSTEM AND APPARATUS.

SPECIFICATION forming part of Letters Patent No. 540,729, dated June 11, 1895.

Application filed February 27, 1895. Serial No. 539,924. (No model.)

*To all whom it may concern:*

Be it known that I, WILLIAM P. ELLIOTT, a citizen of the United States, residing at Chicago, in the county of Cook and State of Illinois, have invented a certain Improved Railway-Switch System and Apparatus; and I do hereby declare that the following is a full, clear, and exact description of the invention, reference being had to the accompanying drawings.

The present invention relates to a system of derailing switches for railway crossings, in which the danger from collisions between trains on the intersecting tracks, is avoided in a very perfect manner.

Various objects of my present invention are as follows: first, to provide in connection with the usual derailing system of switches, in which the switch or switches are operated from a central station, a simple and efficient provision whereby the switches are normally held in a condition of "derail," and in which the intervention of an outside agency entirely independent of the crossing station is required, before such switch or switches can be operated from the central station to a "clear" track condition; such outside agency consisting in the case of a combined street railway and a steam railway crossing, of the conductor of the approaching street car; and in the case of an ordinary steam railway crossing, the "derail" position of the switches of an intersecting track, or the safety position of the crossing gate will constitute such outside agency, that renders it possible to operate the desired switch to a "clear" track condition from the central station; second, to provide a simple and effective pneumatic apparatus by which the above described system can be carried out in a very perfect and efficient manner, and by which when the invention is used in connection with a steam railway crossing the interlocking of the different switches is absolutely assured in the continued use of the apparatus, as will hereinafter more fully appear and be more particularly pointed out in the claims; third, to provide a simple and efficient switch operating mechanism in which an automatic locking of such mechanism in either of its two positions is effected, to positively hold the switch to a derail or to a clear track, and which automatic lock is suitably released, in the operation of the switch actuating mechanism to change the switch from one position to the other, as will hereinafter more fully appear and be more particularly pointed out in the claims.

In the accompanying drawings I illustrate a pneumatic apparatus as adapted to carry into effect my present system of safety switches for railway crossings, and in which—

Figure 3:
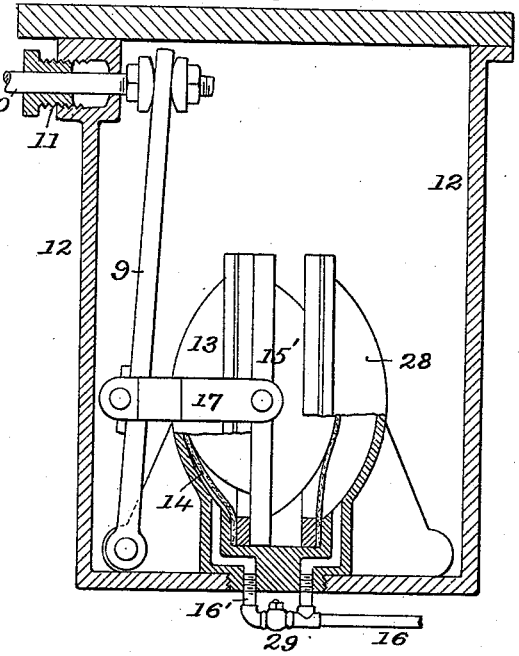
Figure 2:
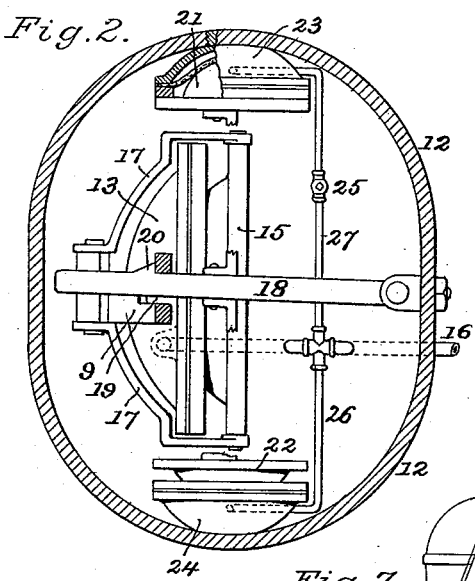
Figure 4:
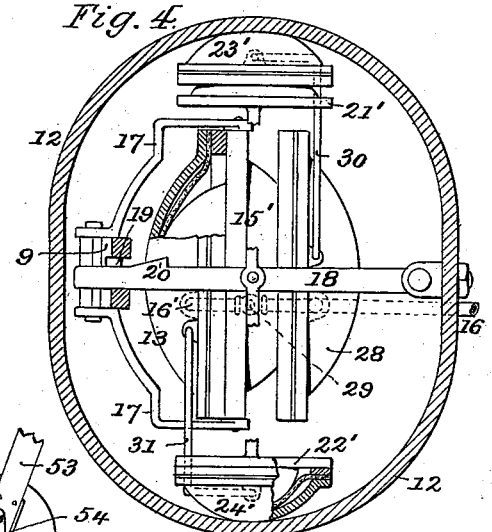
Figure 7:
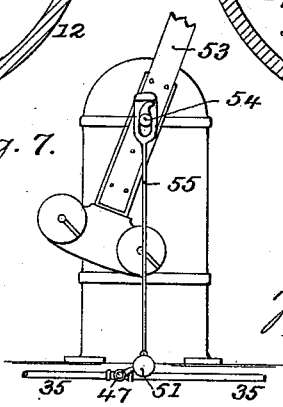
Figure 12:
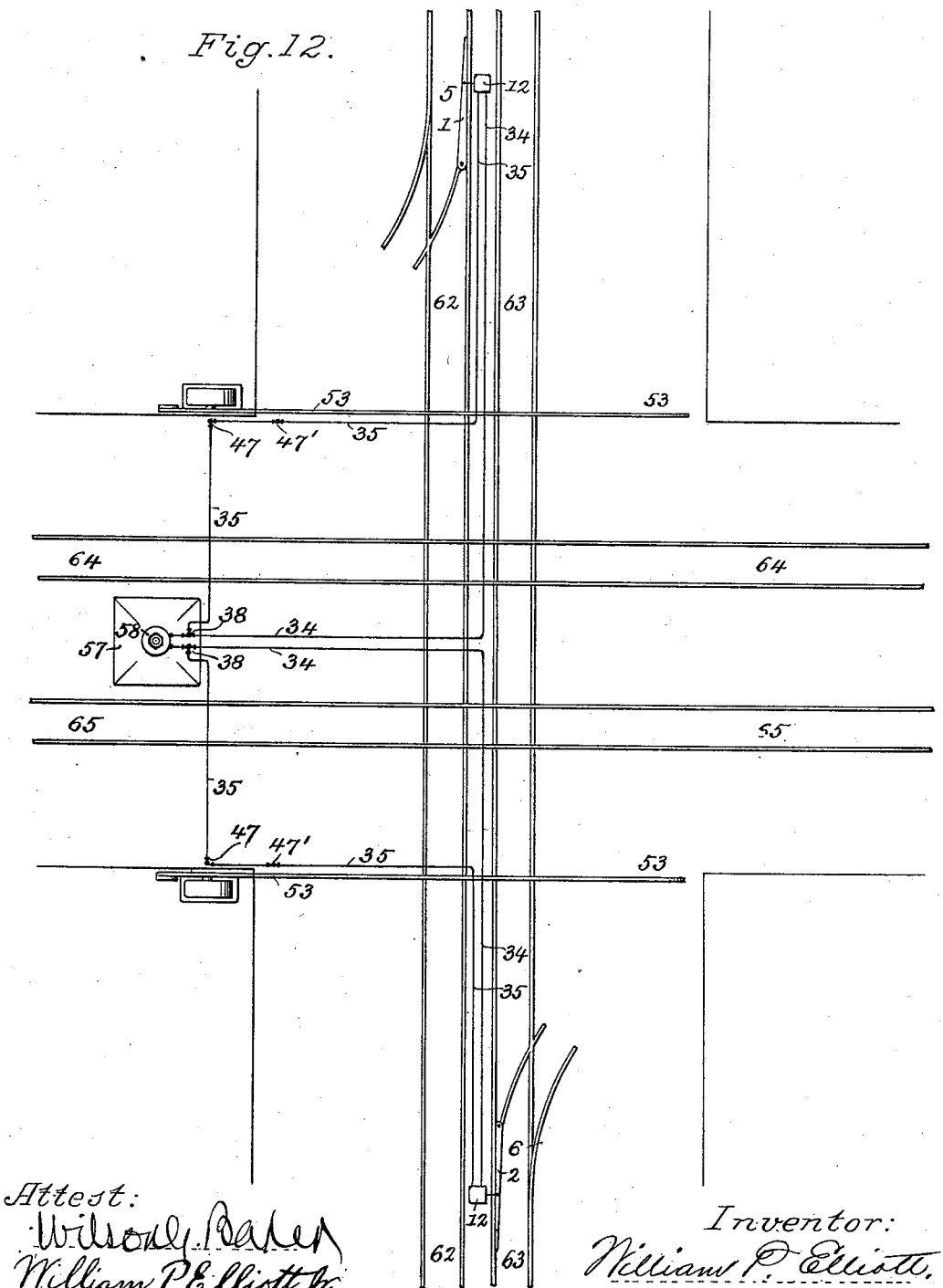

Figure 1 is a vertical sectional elevation of a switch-operating mechanism constructed in accordance with the present invention and illustrating a primitive or single-action type of such mechanism; Fig. 2, a horizontal sectional view illustrating the primitive type of the switch-operating mechanism shown in Fig. 1, provided with an automatic locking mechanism for locking such switch mechanism in a "derail" position of the switch. Fig. 3 is a vertical sectional elevation of a more advanced or double-acting type of the aforesaid switch-operating mechanism adapted to operate the railway-switch in both directions by a single pneumatic-pressure supply-pipe; Fig. 4, a horizontal sectional view illustrating the type of switch-operating mechanism shown in Fig. 3, provided with an automatic lock mechanism for locking such switch mechanism in a "derail" position of the switch; Fig. 5, a vertical sectional elevation of a still more advanced type of such switch-operating mechanism, in which direct pressure is employed to operate the mechanism in either direction and in which the automatic locking mechanism is adapted to lock such switch mechanism in either position; Fig. 6, a horizontal sectional view of the same; Fig. 7, a detail side elevation of an ordinary highway-crossing gate, illustrating the connection between the same and the operating circuit or connection of the switch-operating mechanism of the present system; Fig. 8, an enlarged detail axial sectional elevation of a reversing-valve for use in the railroad tower or station for controlling the operation of the switch-actuating mechanism; Fig. 9, a section of the same at line *x x*, Fig. 8; Fig. 10, a section of the same at line *x' x'*, Fig. 8; Fig. 11, a detail sectional elevation of a three-way valve for making and breaking connection in the operating-circuit or pipe connection of the switch-operating mechanism by which the switch is moved to "clear track." Fig. 12 is a diagrammatic view illustrating my present improved system as applied to a steam-railway and street-railway crossing; Fig. 13, a similar view showing the application of the present system to a railway-crossing. Fig. 14 is a detail sectional elevation illustrating the "waste-valve" of the "clear-track" pipe connected to and controlled by the switch-operating mechanism of an opposing track.

Similar numerals of reference indicate like parts in the several views.

The main and distinguishing feature of novelty and value in the present safety system of railway crossing switches, lies in the provision of an interrupted circuit or connection arranged at a point removed from and entirely independent of the crossing tower or station, and between the location of the railroad towerman, or crossing guard, and the means whereby any of the switches are moved to "clear tracks," and which interrupted circuit or connection can only be completed so that the towerman or crossing guard can operate the desired switch to a "clear" track position, by an outside intervention, independent of such crossing guard, such, for instance, as the conductor of an approaching train, or the raising of the highway crossing gates, or the "derail" position of the switches of the other intersecting and conflicting tracks, or one or more of such aforesaid interventions combined, as the particular circumstances of the case may suggest, or the necessity for extra precaution may require.

For general use preference is given to a pneumatically operated switch actuating mechanism, to carry into effect the present system of safety switches for railway crossings, on the ground of simplicity and durability of construction, as well as the continued accuracy and efficiency in long use under the varying atmospheric changes to which the apparatus is exposed. My present system can however be carried into effect by means other than the pneumatic, above mentioned, and it is within the province of this part of my invention to use either an electro motive force, or a mechanical one, to either actuate the whole system, or only the safety portion thereof, that forms the essential feature of novelty of said system.

Referring to the drawings, the switch tongues 1, 2, 3, and 4, see Figs. 5, 12, and 13, of the derailing switches 5, 6, 7, and 8, are of any usual and suitable construction, and are connected to the operating lever 9, of the switch operating mechanism by means of a rod or connection 10, preferably arranged under-ground, and adapted to pass in a water tight manner through a stuffing box 11, at the side of the closed casing 12, of the switch operating mechanism.

The switch operating mechanism, in its primary form as illustrated in Fig. 1, consists of a stationary pressure head or chamber 13, of a cup shaped formation, the mouth of which is closed by a flexible diaphragm 14; and a moving piston 15 having an end, which in the construction shown is convex, next adjacent to the diaphragm, and bearing against the same, so as to receive motion therefrom when a pressure supply is introduced into the interior of the pressure chamber 13, by the pressure supply pipe 16.

17, is a connecting link between the piston 15, and the switch operating lever 9, which in the construction shown is pivoted at its lower end near the bottom of the inclosing casing 12, of the apparatus, its upper end being connected in an adjustable manner to the rod connection 10, of the switch.

In a more advanced type of the switch operating mechanism, above described and as illustrated in Fig. 2, an automatic locking mechanism is added, to lock the switch operating mechanism in a "derail" position. In this, 18, is a horizontal moving catch bar passing through an orifice 19, in the switch operating lever 9, and having a lateral projection or tooth 20, adapted to engage the side of the orifice 19, in the switch lever 9, to lock the same in its backward position, and lock and hold the railway switch to a "derail." The catch bar 18, has connection with the pistons 21, and 22, of the oppositely arranged single acting pneumatic motors 23, and 24, so as to be actuated by the same. In the present construction the pneumatic motor 24, receives pressure supply direct from the same source of supply to the switch operating motor 13, while the opposite motor 23, receives its pressure supply from the same source through a check valve 25, that prevents a back flow from said motor.

It is material to the present type of apparatus that the piston 21, of the motor 23, be made of a less size or area than the piston 22, of the motor 24, so that when pressure is on the apparatus through the single supply pipe 16, the tendency will be to force the catch bar 18, into a position to engage the switch operating lever 9, when the same has been drawn backward by the motor 13, to effect the "derail" position of the switch; and when pressure is removed from the apparatus, by releasing the air pressure from the supply pipe 16, the air confined in a compressed state in the pneumatic motor 23, by the instrumentality of the check valve 25, will through its expansive force acting against the piston 21, force the catch bar 18, in an opposite direction to unlock the same from its engagement with the switch operating lever 9, leaving the switch free to be operated by any usual manual means, such for instance, as an ordinary switch stand, when it is desired to move the switch to a "clear" track.

26, is a branch pipe extending from the main or supply pipe 16, to the operating chamber of the motor 24.

27, is a branch pipe, containing the check valve 25, and extending from the main supply pipe 16, to the operating chamber of the motor 23.

In the above type of apparatus, the motor 23, performs the functions of an elastic cushion that is compressed by the more powerful motor 24, in its forward stroke, and returns the parts to their original positions when pressure supply is removed from such motor 24. The advantage of the present arrangement and its superiority over any other cushion or spring which might be used for the same purpose being that its elasticity is constantly maintained to a degree equal to the pressure supply from time to time used in motor 24, which can at all times be replenished from the main pressure supply whatever this may be, thus placing the condition of this cushion under the control of the towerman, or crossing guard, in this respect.

In another type of the switch operating mechanism, as illustrated in Fig. 3, the same general construction as that shown in Fig. 1, will prevail with the addition of a pneumatic motor 28, acting upon the piston 15, in a direction opposite to the motor 13, that moved the switch mechanism to a derail, the motor 28, in this case, acting to move the switch mechanism to "clear track;" and it is material to this present construction that the head of the piston 15', in contact with the diaphragm of the motor 28, be of a greater size or area than that of the end of such piston that is in contact with the diaphragm of the motor 13; and further that a check valve 29, be inserted into the section of the supply pipe 16', that supplies air pressure to the operating chamber of the motor 13. With this construction the motor 13 performs the function of an elastic cushion due to the contained air being confined under pressure by the check valve 29, when pressure supply is introduced through the main supply pipe 16, into the motor 28, to move the switch mechanism to "clear" track.

When pressure is removed from the motor 28, by releasing the air under compression from the supply pipe 16, the air confined in a compressed state in the operating chamber of the pneumatic motor 13, by the check valve 29, will, through its expansive force, acting against the piston 15', push the same backward to operate the switch lever and move the switch parts to a derail, which in the present construction is the normal position of the parts. The purpose of check valve 29, in the connection of the motor 13, with the source of pressure supply, is the same as in the former construction heretofore described, to wit, to replenish and maintain the desired pressure or cushion within the same during a long and continued use of the apparatus.

In a more advanced type of the switch operating mechanism, above described, and as illustrated in Fig. 4, an automatic locking mechanism substantially identical with that described in connection with Fig. 2, is added to lock the switch operating mechanism in a position of "derail." In this, 18, is a horizontally moving catch bar passing through an orifice 19, in the switch operating lever 9, and having a lateral projection or tooth 20, adapted to engage the side of the orifice 19, in the switch lever 9, to lock the same in its backward position, and lock and hold the railway switch to a position of "derail." The catch bar 18, has connection with the pistons 21', and 22', of the oppositely arranged single acting pneumatic motors 23', and 24', so as to be actuated by the same. In the present construction the pneumatic motor 23', receives pressure supply from the operating chamber of the motor 28, through pipe connection 30, while the motor 24', receives its pressure supply from the operating chamber of the motor 13, through pipe connection 31. It is material to the present type of apparatus that the piston 22', of the motor 24', be made of a less size or area than the piston 21', of the motor 23', so that when pressure is on the connected operating motors, 28 and 23', of the apparatus through the single supply pipe 16, the tendency will be to force the switch into a "clear" track condition, the catch bar 18 being initially disengaged from the switch operating lever 9, and the switch operating lever then pushed forward to attain the desired "clear" track condition of the switch. When pressure is removed from the aforesaid motors, 28, 23', by releasing the air pressure from the supply pipe 16, the air confined in a compressed state in the connected motors 13 and 24', by the instrumentality of the check valve 29, will through its expansive force acting against the pistons 15' and 22', force the catch bar 18 into a position to engage the switch operating lever 9, and then draw said switch operating lever backward to attain a "derail" condition of the switch, and an automatic locking of the same in such "derail" condition by the engagement of the tooth 20 of the catch bar 18, and the lever 9.

It will be readily understood that instead of making the different pistons 21, 22', and piston end 15', of the different motors 23, 24', and 13, of a less size than the different pistons 22, 21', and piston end 15', of the different motors 24, 23', and 28, the same inequality of pressure exerted on these pipes may be attained by locating these piston heads so that of piston 21, &c., is farther from its motor 23, &c., and hence will have a less area in contact with the flexible diaphragm of its motor than the piston head of piston 22, is from its motor 24.

In another type of the switch operating mechanism, as illustrated in Figs. 5 and 6, consists of a pair of oppositely arranged stationary pressure chambers 13, and 32, of a cup shaped formation, the mouths of which are closed by flexible diaphragms 14, and 33, and a piston 15'', moving between such chambers, and having ends, shown convex, that bear against the respective diaphragms 14, and 33, so as to receive alternate motion therefrom and in opposite directions, when pressure of air is introduced into one or the other of the pressure chambers 13, and 32, by the respective supply pipes 34, and 35, which for subsequent description are denominated the "derail" and the "clear" track pipes, respectively, since by their instrumentality such corresponding positions of the railway switch are attained. As in the previous types heretofore described 17, is a connecting link between the piston 15'', and the switch operating lever 9; and 18, is a horizontally moving catch bar passing through an orifice 19, in the switch operating lever 9, and provided with oppositely arranged lateral projections or teeth 20, and 20', adapted to engage the respective sides of the orifice 19, in such switch lever to lock the same in its forward as well as backward position and hold the railway switch to a "clear track" or to a derail position in a positive manner. The catch bar 18, has connection with the pistons 21'', and 22'', of the oppositely arranged single acting pneumatic motors 23'', and 24'', so as to be actuated by the same in opposite directions, as pressure is admitted into one or the other of the operating chambers of such motors. Such motors 23'', and 24'', are connected respectively, with the main or switch operating motors 32 and 13 by pipe connections 37 and 36, so that the presence of a pressure supply in any one of the switch operating motors 32 and 13, will act to initially operate the release motor 23'', or 24'', thereof, to release the catch bar 18, from its engagement with the switch operating lever 9, so as to leave the same free to be operated by such particular switch operating motor 32 and 13.

In a switch system employing the different types of switch operating apparatus illustrated in Figs. 1, 2, 3 and 4, in which a single pressure supply pipe 16, extending from a suitable source of pressure supply in the railway crossing tower, or station, to the operating apparatus of "clear" track or derailing switches 5, 6, 7 and 8, that may be employed to guard the crossing, and which are adapted to convey a pressure supply to the switch operating mechanism so as to force the switch to a position of derail, and normally hold the same to such position, the different pressure supply pipes 16, will be provided with a valve located in the railway crossing tower or station, and which will be of any usual form and construction that will attain an admission as well as effect a shutting off of the pressure supply to such pipe 16, and the subsequent opening of such pipe 16, to the atmosphere, when it is desired to open the switch operating mechanism, so that the same can be manually operated to attain a "clear" track position of the switch.

In a switch system employing the type of switch operating apparatus illustrated in Figs. 5 and 6, and in which the separate or individual "derail," and "clear" track pipes or connections 34, and 35, extend from a suitable source of pressure supply in the railway crossing tower, or station, to the operating apparatus of each of the railway switches 5, 6, 7, and 8, that may be employed to guard the crossing, and which are adapted to convey pressure supply to the switch operating motors, to move the switches to a "derail," or "clear" track position, as desired, and to lock and hold the same in such positions, in a positive manner, each pair of individual "derail" and "clear" track pipes 34, and 35, will be provided with a controlling valve 38, located in the railway crossing tower or station. Such valve 38, may be of any usual and well known type of reversing valve, in which a pair of pipes or parts, such as 34, and 35, are alternately placed in communication with the source of pressure supply, and with the atmosphere, the one receiving a pressure supply, while the other is exhausting to the atmosphere, and vice versa.

In Figs. 8, 9, and 10, I illustrate a simple and efficient form of reversing valve for employment as above. In this, 38, is the valve casing provided with an inlet neck 39, for connection to the source of pressure supply; a pair of outlet necks 40, and 41, for connection to the "derail" and "clear" track pipes or conductors 34, and 35, of the switch operating mechanism, one of such necks 40, being in line with the inlet neck 39, and the other of such necks 41 being arranged at right angles to such inlet neck 39; and a pair of waste ports, 42, 43, arranged in a right angle relation to each other, and in a lateral relation to the pair of outlet necks 40, and 41. 44, is the tapering valve plug of the casing provided with the usual three way port, 45, adapted to register with the ports of the necks 39, 40, and 41; and with a single laterally extending waste port 46, formed in its periphery, that is adapted to put the neck 40, and the waste port 42, or the neck 41, and the waste port 43, in communication, in accordance with the one or the other position of the plug 44, within the valve casing 38.

The operation of the above reversing valve will be as follows: A quarter turn of the valve plug 44, to the position indicated in Figs. 8, 9, and 10, brings the three way port 45, into communication with the port of the supply neck 39, and the port of the outlet neck 41, to which the "clear" track pipe 35, of the switch operating mechanism is connected. A pressure supply is thus introduced into the "clear" track pipe 35. At the same time the laterally extending waste port 46, is brought into line with the waste port 42, and the port of the outlet neck 40, to which the "derail" pipe 34, of the switch operating mechanism is connected, and any air under pressure confined in said pipe 34, and its connections is free to escape. A quarter turn of the valve plug in an opposite direction to cause a reversal of the above conditions, brings the three way port 45, into communication with the port of the supply neck 39, and the port of the outlet neck 40, to which the "derail" pipe 34, of the switch operating mechanism is connected, and a pressure supply is accordingly introduced into such "derail" pipe 34. At the same time the laterally extending waste port 43, and the port of the outlet neck 40, to which the "clear" track pipe 35, of the switch operating mechanism is connected; and any air under pressure confined in said pipe 35, and its connections, is free to escape.

In the present construction, the "derail" pipe 34, may be provided with an ordinary check valve to prevent a back-flow of pressure, and in this case the normal tendency will be to hold the switch to its "derail" position; and in this connection it will be preferable to also provide such pipe 34 with a "bleeder" valve, so that the amount or degree of cushion maintained in the chamber 13 can be regulated as required.

In the present invention the "clear" track pipe or conductor 35, is provided with an automatic valve 47, of any usual and approved construction that will normally either close the passage way of said pipe or hold said pipe open to the atmosphere so that no pressure supply can pass through said "clear" track pipe to the switch operating mechanism, and which valve in the present system, is capable of being placed in such closed condition closed to the atmosphere, manually by the conductor of a train approaching the crossing, and automatically by connection either to the operating mechanism of the highway crossing gate, so that said valve will be closed when the gate is raised; or to the switch operating mechanism of one or more of the intersecting tracks, so that when such last mentioned switch operating mechanisms are in a position of "derail" said valve will be closed to the atmosphere to permit of pressure passing to the operating "clear" track motor of the switch operating mechanism of another switch which it is desired to operate.

In Fig. 11, I illustrate a simple form of valve for such use, in which 47, is a valve casing introduced between sections of the "clear" track pipe 35, and provided with a side waste port 48. Within this casing is arranged a valve plug 49, having a cross port or passage 50, adapted to register with the different ports of the valve casing, the construction being such that when the cross port 50 is open to the waste port 48, the plug 49 also bars the further passage of pressure through the "clear way" pipe 35 to the switch operating mechanism. In said Fig. 11, I illustrate this valve as moved and held to its waste or normal position by a weighted arm 51. Instead of such means, a spring or other equivalent means may be employed to attain such result. 52, is a handle attached to such weighted arm, for convenience in manually operating said valve. In Fig. 7, I illustrate said valve adapted for operation by the highway crossing gate, 53. In this 54 is a lifting tappet on the axle of the gate, that engages under a projection on a yoke rod 55, that is connected to the weighted operating arm 51, of the waste valve 47; the arrangement being such that when the gate is raised, said valve operating arm 51 will also be raised and the valve 47 closed to the atmosphere to permit pressure to pass through the "clear" track pipe to the operating mechanism of the switch.

In Fig. 14, I illustrate a waste valve 47, adapted for operation by the operating mechanism of one of the other crossing switches. In this case 56 is a link connecting the switch operating arm with the operating arm 51 of the waste valve 47, the arrangement being such that when such switch operating arm is in a "derail" position the valve 47, will be closed to the atmosphere to permit pressure to pass through the "clear" track pipe 35, to the operating mechanism of the other switch that it is intended to move to a "clear" track position. It is immaterial to the present invention whether the waste valve 47, be inserted directly in the "clear" track pipe 35, or in a branch from the same.

The above type of switch operating mechanism as shown in Figs. 5 and 6, is the one employed for the sake of illustration in the diagram views, Figs. 12 and 13, which are intended to illustrate the arrangement and operation of the present system of safety switches for railway crossings.

In the diagram view, Fig. 12, I illustrate my present system of safety switches as applied to a steam railway and street railway crossing. In this the respective street car tracks are provided with derailing switches 5, and 6, adapted to derail a street car approaching the railway crossing in case the steam railway tracks are occupied by a passing train. 57, is the usual railway crossing tower or station containing an air pump 58, or other source of pressure supply. 38 are the series of reversing valves controlling the pressure supply of the "derail" and "clear" track pipes 34, and 35, that extend to the operating mechanisms of the switches 5 and 6. 47, 47', are a pair of waste valves, as heretofore described, that are inserted in each "clear" track pipe 35, the one being automatically operated and controlled by the highway crossing gate 53, while the other is adapted to be operated manually by the conductor, &c., of an approaching street car. In the present system both of these valves may be employed conjointly, or one or the other may be omitted, in accordance with the amount of precaution required at the particular crossing. With both of such valves in use a "clear" track for the street car can only be attained by the joint intervention of the street car conductor, &c., and the highway crossing gate in its raised condition. When a less degree of precaution is required the same may be attained by the sole intervention of the crossing gate, or of the conductor, &c., of the street car. 62, and 63, are the street car tracks and 64, and 65, the steam railway tracks.

In the diagram view Fig. 13, I illustrate my present systems of safety switches as applied to a double track railway crossing. In this the respective tracks 64, 65, 66, 67, are provided with derailing switches 5, 6, 7, and 8, adapted to derail a railway train approaching the railroad crossing in case the other intersecting track or tracks are occupied by a passing train. 57, is the usual railway crossing tower or station containing an air pump 58, or other source of pressure supply. 38, are the series of reversing valves controlling the pressure supply to the "derail" and "clear" track pipes 34, and 35, that extend to the operating mechanism of the switches 5, 6, 7, and 8. 47, are individual waste valves, as heretofore described, inserted in branch pipes 68, from the "clear" track pipes 35. Such branch pipes 68, being shown in dotted lines to distinguish them more readily from the main pipes which are shown in full lines. Each branch pipe 68, extends to a point adjacent to the switch operating mechanism of an intersecting or conflicting track, at which point the waste valve 47, in such branch is connected to and under the control of the switch operating mechanism of such intersecting track, the arrangement being such, as heretofore described, that said switch operating mechanism of the intersecting tracks must be in a position to "derail" before such valve 47 will be closed to the atmosphere automatically to permit the "clear" track pipe 35, to convey pressure to the switch operating mechanism of the other or first mentioned track to attain a "clear" track condition of the same. I prefer to separately connect together the different branch pipes 68, belonging to the switch operating mechanisms of each line of tracks, as shown in said Fig. 13, so that before a "clear" track can be attained on any one track, all the switches of the intersecting or conflicting tracks must be in a position to derail.

Having thus fully described my invention, what I claim as new, and desire to secure by Letters Patent, is—

1. In a system of railway crossing switches in which the switches are normally maintained in a derail condition by an operating fluid pressure, under the control of the crossing guard, the herein described improvement consisting of a conductor, extending from the crossing station to the switch operating mechanism to operate the switch to clear track, and which is of a broken or interrupted nature at a point separate and removed from the crossing station, to render the switch operating mechanism normally inactive and in a derail condition, such interruption or break in the conductor being adapted to be closed by an outside and independent agency before the crossing guard can operate the switch to clear track, substantially as herein described.

2. In a system of railway crossing switches in which the switches are normally maintained in a derail condition by an operating fluid pressure under the control of the crossing guard, the herein described improvement consisting of a conductor, extending from the crossing station to the switch operating mechanism to operate the switches to clear track and which is of a broken or interrupted nature at a point separate and removed from the crossing station, to render the switch operating mechanism normally inactive and in a derail condition, such interruption or break in the conductor being adapted to be closed by the conductor of an approaching train before the crossing guard can operate the switch to clear track, substantially as herein described.

3. In a system of safety switches for railroad crossings, the combination of a pneumatic switch operating mechanism, comprising a pressure chamber, a diaphragm, a piston bearing against said diaphragm, an operating lever connected to said piston, and a connecting rod, connecting the operating lever and switch tongue together, a source of pressure supply located in the crossing station, a pneumatic operative connection extending from said mechanism to the source of pressure supply in the crossing station, and an automatic locking mechanism adapted to engage the switch operating lever, the same consisting of a catch bar, and a pneumatic motor therefor, that has connection with the same source of supply as the switch operating motor, substantially as set forth.

4. In a system of switches for railroad crossings, the combination of a pneumatic switch operating mechanism comprising a pair of opposed pressure chambers, diaphragms for the same, a piston having opposite faces bearing against said diaphragms, an operating lever connected to said piston, and a connecting rod connecting the operating lever and switch tongue together, a source of pressure supply located in the crossing station, a pneumatic operative connection extending from said mechanism to the source of pressure supply located in the crossing station, and an automatic locking mechanism adapted to engage the switch operating lever, the same consisting of a catch bar and a pneumatic motor therefor, that has connection with the same source of pressure supply as the switch operating motor, substantially as set forth.

5. In a switch operating mechanism, the combination with the switch tongue of an operating mechanism, comprising a pair of opposed pressure chambers, diaphragms for the same, a piston having opposite faces bearing against the diaphragms, such motors being of unlike piston areas, an operating lever connected to said piston, a connecting rod connecting the lever to the switch tongue, an automatically operated catch bar, adapted to engage said lever, and a source of pressure supply, connected directly to the larger motor, and indirectly through a check valve with the smaller motor, substantially as set forth.

6. In a switch operating mechanism, the combination with the switch tongue, of an operating mechanism, comprising a pair of opposed pressure chambers, diaphragms for the same, a piston having opposite faces bearing against the diaphragms, such motors being of unlike piston areas, an operating lever connected to said piston, a connecting rod connecting the lever to the switch tongue, a catch bar adapted to engage such lever, a double acting motor for such locking bar, consisting of a pair of opposed pneumatic motors of unlike piston areas, and a source of pressure supply connected directly to the larger motor, and indirectly through a check valve with the smaller motor, substantially as set forth.

7. A pneumatic switch operating mechanism, comprising in combination, a switch, an operating motor therefor, a source of pressure supply extending from the crossing station to the said motor, and a normally open valve 47, arranged in said source of supply at a point separate and independent of said crossing station, substantially as set forth.

8. A pneumatic switch operating mechanism, comprising in combination, a switch, an operating motor therefor, a source of pressure supply extending from the crossing station to said motor, a normally open valve 47, arranged in said source of supply at a point separate and independent of said crossing station, and a highway crossing gate connected to and adapted to operate said valve, substantially as set forth.

In testimony whereof witness my hand this 23d day of February, A. D. 1895.

WILLIAM P. ELLIOTT.

In presence of—
  WILSON G. BAKER,
  WILLIAM P. ELLIOTT, Jr.